United States Patent [19]

Shimotohno

[11] Patent Number: 4,760,460

[45] Date of Patent: Jul. 26, 1988

[54] HALFTONE IMAGE TRANSMISSION METHOD

[75] Inventor: Susumu Shimotohno, Atsugi, Japan

[73] Assignee: Ricoh Company, Ltd., Tokyo, Japan

[21] Appl. No.: 693,018

[22] Filed: Jan. 18, 1985

[30] Foreign Application Priority Data

Jan. 20, 1984 [JP] Japan .................................... 59-8254

[51] Int. Cl.[4] ............................................ H04N 1/419

[52] U.S. Cl. ..................................... 358/261; 358/283

[58] Field of Search ................ 358/260, 261, 280, 283

[56] References Cited

U.S. PATENT DOCUMENTS 4,578,713 3/1986 Tsao et al. ........................... 358/283

*Primary Examiner*—Edward L. Coles, Sr.
*Attorney, Agent, or Firm*—Cooper & Dunham

[57] ABSTRACT

A method for transmitting a halftone image using the dither method is provided. In accordance with the present invention, an original image to be transmitted is divided into a plurality of regions corresponding in pattern and shape to the dither matrix used. And, each of the regions thus divided is further subdivided into a plurality of subregions of predetermined shape and then the average value of density for each of the regions is calculated. This average value is then compared with each of the thresholds of the corresponding group in the dither matrix to determine the location of a maximum threshold among those thresholds which are equal to or less than (or less than) the average value to determine an address for each of the regions. Then, such a string of addresses is subjected to a predetermined coding for compression of data to be transmitted. Upon receipt of such data, the process described above is basically reversed to reconstruct a dither-processed halftone image.

10 Claims, 5 Drawing Sheets

$M_1$ $M_3$ $M_4$ $M_2$

| 0 | 8 | 2 | 10 |
|---|---|---|---|
| 12 | 4 | 14 | 6 |
| 3 | 11 | 1 | 9 |
| 15 | 7 | 13 | 5 |

| 0 | 2 | 0 | 2 |
|---|---|---|---|
| 3 | 1 | 3 | 1 |
| 0 | 2 | 0 | 2 |
| 3 | 1 | 3 | 1 |

MSB LSB 1 0 0 ---- ALL WHITE 0 0 0 ---- ADDRESS 0

0 0 1 ---- ADDRESS 1

0 1 1 ---- ADDRESS 2

0 1 0 ---- ADDRESS 3

PLANE 2 PLANE 1 PLANE 0

| | | |
|---|---|---|
| 1 | 0 | 0 |
| 1 | 0 | 1 |
| 1 | 1 | 1 |
| 1 | 1 | 0 |

ALL WHITE ADDRESS

MSB LSB

HALFTONE IMAGE TRANSMISSION METHOD

BACKGROUND OF THE INVENTION

1. Field of the Invention

The present invention relates to a method and system for transmitting a halftone image, and, in particular, to a method for handling an image signal representative of a halftone image employing the dither method to be transmitted between a transmitter and a receiver at a remote place under compression.

2. Description of the Prior Art

In transmitting an image signal, use is normally made of MH (Modified Huffman) coding or MR (Modified Read) coding according the CCITT standards so that the transmission of binary image signal can be carried out at high efficiency with considerable suppression of redundancy. Although use is made of either of these coding schemes, when transmitting a halftone image, because of peculiarities present in a halftone image, data compression cannot be carried out efficiently, and, in some cases, the amount of data after compression becomes larger than that before compression. It has thus been recognized that impracticability exists in having a halftone image signal coded in the same manner as in the case of having a binary image signal coded. This is a natural consequence because the MH and MR coding schemes mentioned above have been set up so as to be consistent with the statistical properties of typical documentary or graphical images, which may be converted into binary image data quite simply. Since a halftone image, such as a picture, has a gray scale continuously changing in density from black to white as opposed to documentary images, the coding efficiency may drop dramatically when the MH and MR schemes, which have originally been established for documentary images, are used.

According to CCITT standards, for such a special image as a halftone image, there is provided a "non-compression" mode in which a string of pixel data is transmitted without compression. This is because, there are cases in which the amount of data may be maintained smaller if the data is not coded. This is not always advantageous because in the case of representing halftone with the use of the dither method, it may be so devised that compression coding can be carried out effectively by utilizing its periodic nature.

Use has often been conventionally made of the systematic dither method in order to represent a halftone image by binary pixels. According to this method, however, since the threshold for comparison with the density level of pixel in a halftone image to be processed is used periodically with the dither matrix as a unit in repetition, if an image having a periodic pattern is processed, for example, by a mesh-point image, there is often produced a significant moiré in the resulting image. This is caused by the conflict between the periodicity of the threshold used and the periodicity in pattern of the input image, and as long as use is made of the systematic dither method, it is virtually impossible to prevent this from occurring. In order to cope with this, use may be made of the random dither method, in which a distribution of thresholds in the dither matrix is set up using random numbers; however, this method is not used so often because the quality of resulting image is relatively poor.

Several methods for preventing moiré from occurring in the dither method are proposed as disclosed in Japanese Patent Laid-open Pub. Nos. 57-60772 and 57-125579. In accordance with the method disclosed in the former publication, the properties of an image to be processed are detected by the degree of changes in image signal between a pixel of interest and its surrounding pixels according to the contents stored in a buffer shift register and the pixel of interest is subjected to binary value conversion while changing the threshold level depending on the detected information, thereby carrying out the random dither processing to decrease the periodic moiré produced in the binary-valued image signal. On the other hand, in accordance with the method disclosed in the latter publication, using the random number generated by a random number generator as the threshold value, the density level of each of the pixels of a halftone image is compared thereby determining the density level of output image signal to be either white or black level, whereby the difference between the density level of the pixel of interest for comparison and the density level of the output image is added as distributed in accordance with the coefficient specific to the density level of each of a plurality of pixels adjacent to the pixel of interest prior to comparison to correct the density level of these pixels thereby allowing to prevent moiré from being produced in the output image.

In this manner, when representation of a halftone image is to be carried out for an image having a high frequency periodic pattern, use of either of the above-mentioned two schemes allows to decrease production of moiré, but there is produced a deterioration of image quality.

Under the circumstances, the present inventor has proposed an improved method as disclosed in Japanese Patent Application No. 58-214688 (now Laid-open Pat. No. 60-106269), entitled "HALFTONE IMAGE TRANSMISSION SYSTEM", which allows not only to eliminate moiré but also to represent halftone high in quality by emphasizing the peripheral portion (contour) between dark and light, which significantly influences the quality of a halftone image, at the time of coding for transmission of image data. According to the proposed method, the average value of density level is obtained for the $m \times n$ pixel region corresponding to the $m \times n$ dither matrix as a unit and the thus obtained average value is transmitted as a representative or sample value. That is, according to this method, the image information is transmitted with the sampling of data which is coarser than the sampling of data with the original pixel as a unit.

This is because, in the case of transmission of a halftone image having no abrupt changes in density, no major error will be produced when considered the nature of the dither method. However, even in light and dark information, the contour portion is dynamic in the change between light and dark, and the position of such a boundary must be transmitted accurately without causing any blur. Nevertheless, according to the above-described method, since sampling is made coarser, the information as to the position of boundary becomes obscure as compared with the customary halftone image transmission method. Reproducibility may be improved to some extent by applying the MTF (Modulation Transfer Function) correction for each unit region, but there is a structural limitation in the above-described method because the unit region to be corrected is already coarse so that there are some cases in which distortion appears in the contour since the unit region to be corrected is relatively large.

Therefore, there has been a need to provide a scheme of halftone image transmission high in compression efficiency without lowering the sampling efficiency significantly.

SUMMARY OF THE INVENTION

It is therefore a primary object of the present invention to provide an improved method and system for transmitting halftone image information.

Another object of the present invention is to provide a halftone image transmission scheme capable of transmitting hafltone image information accurately as well as efficiently.

A still further object of the present invention is to provide a halftone image transmission scheme capable of preventing the contour portion of a halftone image from being deteriorated.

A still further object of the present invention is to provide a halftone image transmission scheme capable of preventing the position of a boundary between light and dark areas in a halftone image from being blurred when transmitted.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic illustration showing a few examples of setting up the string of addresses in accordance with the present invention;

DESCRIPTION OF THE PREFERRED EMBODIMENTS

Figures 1, 2, 3:
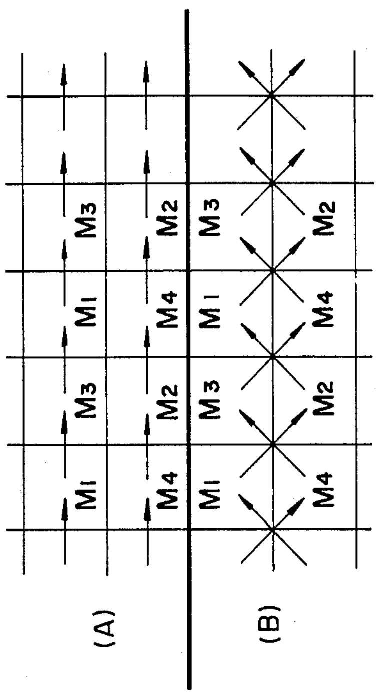
FIG. 1 is a schematic illustration showing the principle of the present invention in calculating the average value for pixel regions.
FIG. 2 is a schematic illustration showing an example of the distributed dither matrix which may be advantageously used in the present invention.
FIG. 3 is a schematic illustration showing the address of each of the four subdivisions of region in accordance with the present invention.

Referring now to FIG. 1, there is schematically shown a scheme for calculating the average value of pixel region in accordance with the principle of the present invention. One of the objectives of the present invention may be attained by only implementing spatial subdivision on an original image to be transmitted in the halftone image transmission system which is disclosed in my prior patent application mentioned above. In addition to the fundamental premise to enhance reproducibility by applying subdivision to the halftone image transmission technique disclosed in the prior application, in order to prevent the lowering of compression efficiency from taking place, use will be made of the following process.

As shown in FIG. 1, a 4×4 pixel region is divided into equal four subdivisions and the average density value for the group of four subdivisions, i.e., $M_1$ through $M_4$, is calculated. At the same time, corresponding to the pixel region, a distributed dither matrix (or the Bayer type matrix in the illustrated example) as shown in FIG. 2 is set up, and for this matrix, an address is allotted to each of the subdivisions corresponding to the magnitude of the threshold in the matrix. In the illustrated embodiment, since it is of the Bayer type dither matrix, the result of the allotment of addresses depending on the magnitude for the group of four subdivisions is identical in pattern.

Then, for each group of the thresholds in the second dither matrix corresponding to the region occupied by each of the average values $M_1$ through $M_4$ shown in FIG. 1, the maximum threshold among the thresholds which are equal to or lower than (or lower than) the average value are detected, and then the corresponding addresses are determined in FIG. 3. Because of the fact that the allotment of addresses has been carried out according to the magnitude of threshold values and dynamic changes in density are not present in a halftone image, the address thus determined is strongly correlated to the surrounding addresses so that addresses are often quite close between the adjacent subdivided regions And, therefore, the regions of the same address are subjected to the run length coding. On the other hand, for the same reason, its address is subjected to the bit plane coding and each plane image is subjected to the MH or MR coding. Besides, since there is a strong correlation between the closer addresses, use may also be made of the prediction coding.

Described as to the above-mentioned correlation, since the number of quantized levels of pixel is set at four bits, each of the average values $M_1$ through $M_4$ has four bits so that there are sixteen tone levels. The average value, which may vary over the range of sixteen levels, is attributed to one of the four threshold values of the corresponding group, which, in turn, is taken out as an address. Thus, this is a process of approximation.

Accordingly, even if the average values $M_1$ through $M_4$ fluctuate a little, it may be coded and transmitted as a representative value for the region. In addition, it often results that there is any difference in the corresponding addresses. For example, in FIG. 1, when attention is focused on the top two regions of the group of four subdivided regions, even if the average values ($M_1$, $M_3$) of these two regions vary consecutively, such as between (4, 9) and (5, 8), both of $M_1$ and $M_3$ will have address 1 when there addresses are obtained corresponding to their average values according to the process shown in FIGS. 2 and 3. It is to be noted in this case however that the address to be obtained is the one corresponding to the maximum value among those which is equal to or lower than the average value.

In this manner, if the amount of change is not so large when the change in the average value is transmitted to the address, such change is neglected as an approximation error at the time of address selection. In the dither method in which a halftone image is to be represented by the density of black pixels in a unit region (contour region of dither matrix), the allowance of such approximation error is guaranteed under the premise that white and black of individual pixels or a group of pixels in a minute region smaller than the matrix are not meaningful by themselves independently. In this manner, addresses are not susceptible to slight fluctuations or changes in the average value and a halftone image as a whole is less in abrupt changes in density so that a strong correlation exists between the adjacent addresses. For this reason, using such a correlation, the above-mentioned coding schemes can be carried out effectively.

There is a case in which no such threshold is present when detecting the maximum threshold which is equal to or lower than (or lower than) the average value described previously. As will be described later, this is the case where the regions corresponding to the average are all white and no black pixels are present. In this case, as a matter of course, there exists no corresponding address in FIG. 3. Thus, each subdivided region must be prepared to provide an imaginary address for this all white case; however, since $M_1$ through $M_4$ are converted into 2-bit addresses in the previous description, address conversion cannot be carried out for all of the cases without providing another bit.

Figures 5A, 5B:
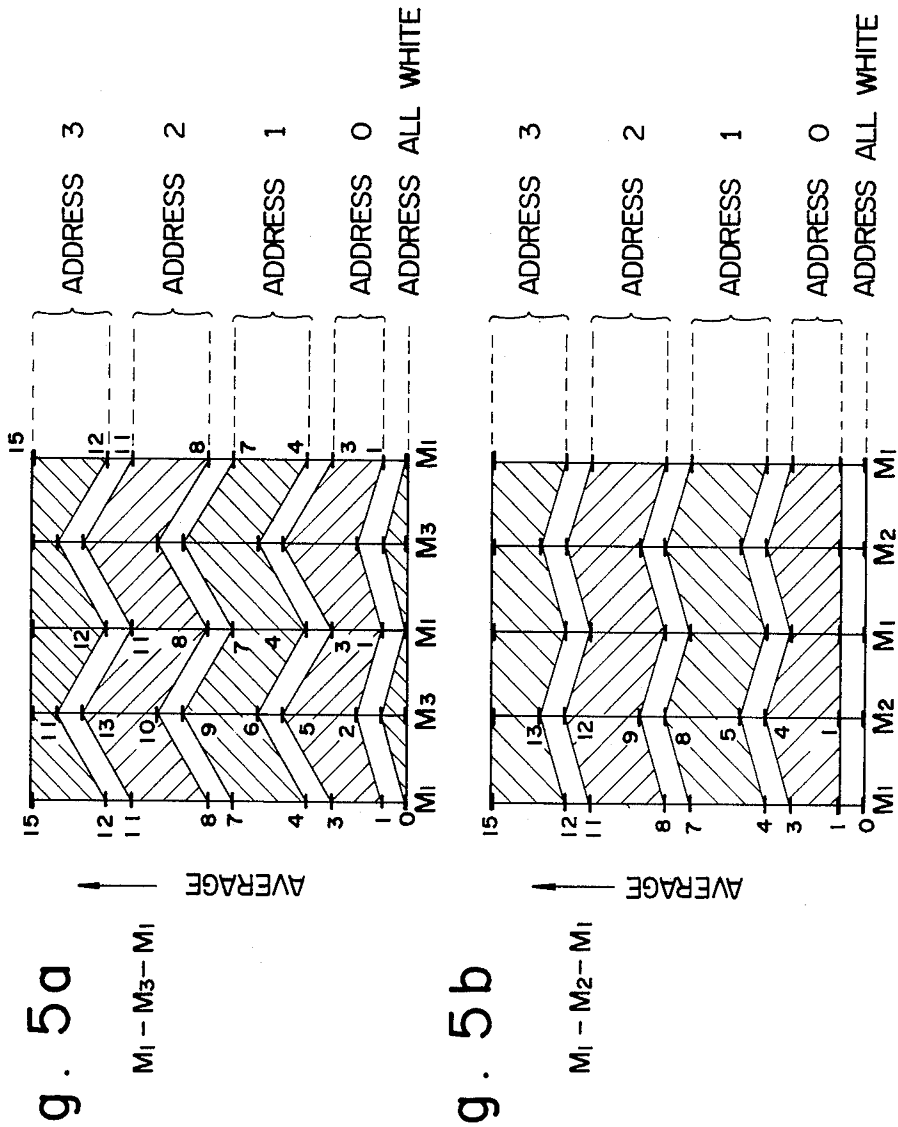
FIGS. 5*a* and 5*b* are schematic illustrations which are useful for explaining the degree of influence on the run length from the average value in the string of addresses shown in FIG. 4.

Now, a description will be had with respect to a string of addresses to be coded. Here, the coding implies the run length and bit plane coding schemes. The direction of run length which is defined in the run length coding scheme or which is defined when each plane image in the bit plane coding scheme is subjected to the MH or MR coding scheme should be determined in the string of addresses, and the method of setting up such a string of addresses is not only one. For example, as shown in FIG. 4(A), there is a simple case of following the scanning direction. Now, let us consider how the average value affects the run length in a series of addresses set up as shown in FIG. 4(A). If the consecutive addresses are the same (the run length becomes longer and thus it can cause to enhance compression efficiency), there are two series of average values, i.e., —$M_1$—$M_3$—$M_1$—$M_3$— and —$M_4$—$M_2$—$M_4$—$M_2$—, corresponding to these addresses as shown in FIG. 5*a*. That is, the shaded section in FIG. 5*a* indicates the allowable fluctuating range of the average value for the same address. It is to be noted that FIG. 5*a* is the case for the series of —$M_1$—$M_3$—$M_1$—, but for the series of —$M_4$—$M_2$—$M_4$—, the similar graph may be obtained only by changing the scaling of average on the ordinate, whereby the allowable fluctuating range remains unchanged. On the other hand, FIG. 5*b* illustrates the allowable fluctuating range of the corresponding average value for the same address in the case where the series of addresses is set up as shown in FIG. 4(B); i.e., —$M_1$—$M_2$—$M_1$— or —$M_4$—$M_3$—$M_4$—.

Now, comparing the results shown in FIGS. 5*a* and 5*b*, in FIG. 5*a*, the light and dark fluctuation of a halftone image is relatively gentle and it is not regular but at random. Thus, if the average value fluctuates similarly, the same address tends to result; if not, however, the allowable fluctuating range is narrowed substantially. On the other hand, the same address tends to persist longer in the case of FIG. 5*b*. Thus, the run length tends to be longer in the case of FIG. 5. And, since longer the run length, the higher the compression efficiency in the above-mentioned two coding schemes, so that in the case of using the Bayer type dither matrix shown in FIG. 2, it is preferable to adopt the two dimensional zig-zag series as shown in FIG. 4(B). It is to be noted however that depending on the dither matrix, such a zig-zag series does not always enhance the compression efficiency so that selection should be made depending on the dither matrix used.

Now, a description will be had as to the individual application of run length coding and bit plane coding schemes.

As described previously, the average value for the group of subdivided regions is converted into the corresponding address (three bits including the all white case in the previous embodiment). In the run length coding scheme, when the same address continues in a series of interest, its run length is coded to carry out compression of data. In this case, however, it becomes meaningless unless the information of the address itself is transmitted together with the run length. In other words, it amounts to multivalue (coarse quantization) transmission. The transmission of address itself may be carried out as connected to the run length code as an extended word. As extended word, the fixed length code is most simple, and if it is so determined at the beginning that an address of fixed bit length follows the run length code between the transmitter and receiver, it may be easily recognized at the receiver.

In the bit plane coding scheme, coding itself is multivalue transmission and each plane image is subjected to compression by using the MH or MR coding, run length coding having another set of run length codes, or prediction coding. As the number of plane images increases, the amount of codes increases correspondingly and the frequency of the lower plane images increases so that the run length becomes shorter and the compression efficiency for the lower planes decreases. On the other hand, in the case where each plane is subjected to the prediction coding, the run length does not have a direct significance. For example, in the case of the address shown in FIG. 3, it is three bits including the imaginary bit and the frequency of each address excepting the all white case becomes uniform as a result of the features of the present invention, and, thus, the fluctuating points in the lower planes are no more than the other planes, which allows to apply the bit plane coding scheme more easily. It is not the multivalue signal as a tone representation of density that makes the frequency of address shown in FIG. 3 uniform, but it is made uniform because the small fluctuations in tone are neglected as conversion error when address conversion is carried out, and if there are less fluctuating points in the lower plane images, there are produced no high frequency images.

Next, one scheme for making the run length of each plane image in the bit plane coding larger will be described below.

In the case of a halftone image, since dynamic light and dark fluctuations are generally scarce, even if the address varies, it is more often than not that the fluctuation of address takes place to the previous address or to the next address from the current address. It is not likely that the address jumps to the second or third previous or next value. Thus, when the address shifts to the last preceding or next following value, it is preferable to minimize the number of plane images which are traversed corresponding to the change in address.

Figures 6, 7, 8:
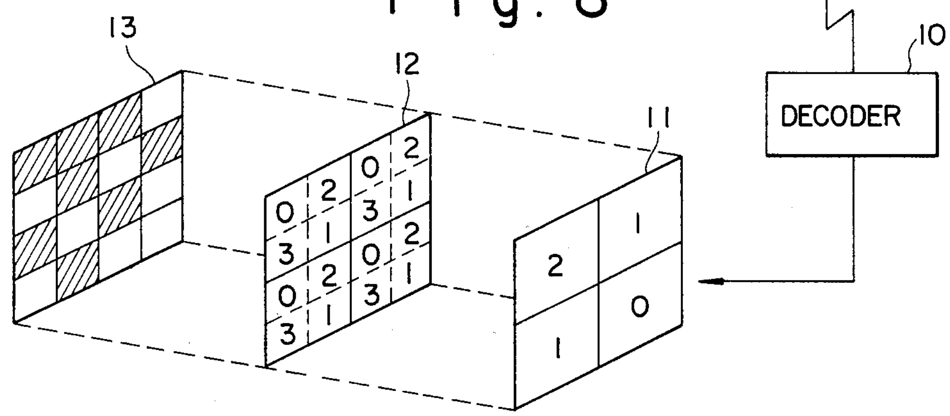
FIG. 6 is a schematic illustration showing a scheme for enhancing the compression efficiency in bit plane coding.
FIG. 7 is a schematic illustration showing the extension of all white address shown in FIG. 6.
FIG. 8 is a schematic illustration showing the overall structure of a receiver section where decoded addresses are coverted into a black pixel pattern.

FIG. 6 illustrates a scheme for enhancing the compression efficiency of bit plane coding. Designating that plane 2 corresponds to most significant bit MSB, plane 0 to least significant bit LSB, "100" to all white, "000" to address 0, "001" to address 1, "011" to address 2, and "010" to address 3, when the address of highest frequency shifts to the last preceding or next following address, the number of planes to be traversed is only one, and, thus, the run length of the other planes is not subdivided by such a change in address.

In FIG. 6, there is shown the case of 4×4 dither matrix with five addresses similar to the previous example. If the transmission signal is determined corresponding to the address in this manner (fixed length code), the fluctuating points in plane images for the address varying mode at high frequency may be minimized, and, thus, the run length may be made longer thereby allowing to enhance the compression efficiency. However, since such a transmission signal does not indicate address by itself, it is necessary to convert it to a predetermined counterpart at the receiver side. In the case of FIG. 6, it may be inversely corresponded in the value representing the transmission signal between addresses 2 and 3.

Furthermore, a description will be had as to the method of setting the all white case so as to minimize the change of bit plane images due to a change of address.

If the number of thresholds in the divided regions within a single dither matrix is $2^N$, the number of addresses is $2^N+1$ because the imaginary address for the all white case is added. Accordingly, as shown in FIG. 6, it may be so set that only the all white address contains "1" as its MSB and the other addresses all contain "0" as their MSB. With such setting, the lower two bits in the all white address are meaningless. Under the circumstances, in the case if it is so set that the lower two bits remain unchanged when a non-all white address changes to the all white address, the plane image of the lower two bits do not change even if the occurrence of entrance into the all white region in the series of subdivided regions takes place, and, thus, the run length is prevented from being subdivided. To maintain the lower two bits intact may be considered as extending the all white address as shown in FIG. 7. Incidentally, as to the mode of applying the prediction coding after address conversion, reference should be made to my prior Japanese Patent Laid-open Pub. No. 60-105269 entitled, "HALFTONE IMAGE TRANSMISSION SYSTEM", which is hereby incorporated by reference. In this case, the determination of prediction function is carried out using the statistical properties in agreement with the present invention.

The description so far has been concerned with the structure and coding operation at the transmitter side. The information thus compressed by coding is then transmitted to the receiver side in communication and the information thus received at the receiver side is then decoded to produce addresses which are processed according to a predetermined pixel-address relation, which is common to the transmitter side, for the corresponding regions in the order of address series.

FIG. 8 schematically illustrates the structure of receiver which carries out address decoding and black pixel pattern conversion. As shown, the illustrated structure includes a decoder 10, decoded address 11, address matrix 12 and corresponding pixel region 13. When the information compressed by coding is received, the decoder 10 decodes the information to produce an address for each region as shown 11. Then, for each region having four subdivided regions, those subdivided regions whose values are equal to or larger than the corresponding address are selected as black pixels, as indicated by shaded sections, while setting the other subdivided regions as white pixels. Here, it is assumed that the addresses have been allotted at the transmitter side in the order of 0, 1, 2, ... as the threshold increases its value.

As described above, in accordance with the present invention, an original halftone image to be transmitted is once represented by average values for a group of subdivided regions covering the image to be transmitted (which may be regarded as resampling) and the average values are converted into addresses with reference to a predetermined dither matrix, which addresses are then compressed by coding for transmission. On the other hand, at the receiver side, upon receipt of the information compressed by coding, the information is decoded to produce addresses which are then subjected to black pixel density conversion by indirectly using the dither matrix with reference to a predetermined relation between address and black pixel position thereby carrying out reconstruction of halftone representation.

For example, in the case where $M_1$ through $M_4$ in FIG. 4 are all same in value, the reconstruction of halftone image exactly same as that obtained by the method disclosed in my prior application mentioned before results. Even in this case, however, in accordance with the present invention, as a fundamental difference from the technique disclosed in my prior application, when a halftone image has a dynamic light and dark change, e.g., the contour region of the image, the present method is capable of faithfully responding to such a fluctuation so that even a mental blur in a halftone image can be obviated. Furthermore, by applying the MTF correction region by region, the contrast of contour may be enhanced. The details of this MTF correction may be found in my prior Japanese Laid-open Pub. No. 60-106269, entitled, HAFLTONE IMAGE TRANSMISSION SYSTEM, as mentioned before, which is incorporated by reference. Also regarding the MTF correction, since the unit region is smaller in the present invention as compared with the technique disclosed in my prior application, a more faithful contour correction can be carried out.

In accordance with the technique disclosed in my prior application, for example, sixteen pixels are represented by a 4-bit value which is then compressed by coding; whereas, in accordance with the present invention, using the address conversion under the same conditions, four pixels are represented by a 3-bit value which is subjected to coding. Thus, in accordance with the present invention, the density fluctuation response is enhanced at the sacrifice of poorer compression efficiency at the beginning. However, with the introduction of address conversion, small fluctuations in average value do not affect the run length. That is, the fluctuating range of representative value in the present invention is approximately $\frac{1}{3}$ of the prior method. Stated differently, since the average value of sixteen tone levels are approximated by five levels, i.e., addresses 0 through 3 and all white address, the fluctuating range is reduced approximately $\frac{1}{3}$ of the prior method. In this sense, in accordance with the present invention, since the small fluctuations attributable to subdivision of run length of average value are absorbed, codes of longer run length are remarkably increased so that even if the compression efficiency is relatively poor at the beginning, it is not so critical and it is considered that there are cases in which the present invention ends up with more efficient coding.

As a comparison, in accordance with the prior method, use is made of compressed codes of average values in transmission of information; on the other hand, in accordance with the present invention, in the case of introduction of address conversion, though it does not appear on the surface at the transmitter side, black pixel density conversion is effectively carried out whereby addresses are designated as converted information and these addresses are compressed by coding for transmission. Accordingly, although the present invention is inferior in terms of compression efficiency at the beginning, but the run length gradually becomes larger so that there is not much difference in overall compression efficiency.

Figures 9, 9A:
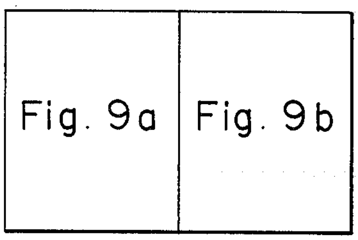
FIG. 9 is an illustration showing how FIGS. 9*a* and 9*b* should be combined.
FIG. 9*a* is a block diagram showing the overall structure of a transmitter section embodying the present invention.
Figure 9B:
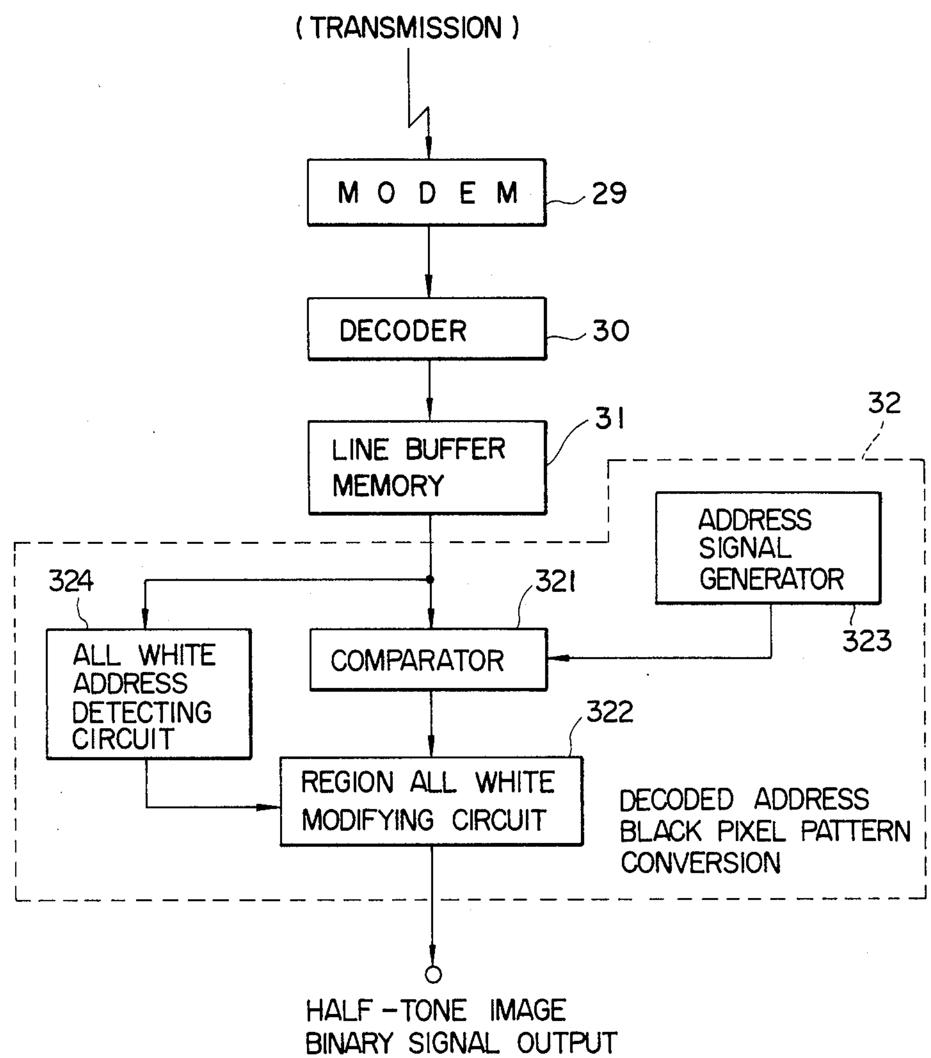
FIG. 9*b* is a block diagram showing the overall structure of a receiver section embodying the present invention.

FIGS. 9*a* and 9*b* illustrate in block form the overall structure of transmitter and receiver for implementing the halftone image transmission method of the present invention. FIG. 9*a* shows the transmitter side and FIG. 9*b* shows the receiver side.

In operation, since an input image signal is serially input line by line, it is once stored in a line buffer memory 21 which is connected to a pixel matrix register 22 so as to allow to read the image signal region by region at the same time. The pixel matrix register 22 supplies a signal to an average value calculating circuit 23 where the average value of density levels of pixels in a region is calculated. Then, the average value thus calculated is subjected to MTF correction region by region. It is to be noted that such MTF correction may be carried out either at the transmitter side or receiver side.

The output from the average value calculating circuit 23 is then stored into a line buffer memory 241. An n×n matrix register 242 is connected to the line buffer memory 241 so that it defines a matrix of average values with the region as a unit by reading the average values for region of interest and its four connecting regions simultaneously from the line buffer memory 241 whereby MTF correction is applied to the region of interest according to a predetermined procedure. This may be carried out by software, logic, table of ROM or a combination of any of these.

A proper threshold detecting circuit 25 is connected to the MTF correction circuit 243 and it detects a maximum threshold among those thresholds which are equal to or less than (or less than) the average value after correction in each group of thresholds in the previously prepared dither matrix. Then, at a conversion address determining circuit 26, it is determined as to which one of the addresses allotted to the region the thus detected threshold correspond to and the threshold is converted into an address. Then, a string of addresses thus converted is then compressed by coding at an encoder 27 and the coded data is processed through a MODEM 28 to be ready for transmission.

On the other hand, at the receiver side as shown in FIG. 9*b*, the data being transmitted is received through a MODEM 29 and supplied to a decoder 30 where the received information is decoded to produce a string of addresses, which is then stored into one of a pair of line memory sections of a line buffer memory 31 over a time interval for scanning the divided regions to which addresses have been allotted in the auxiliary scanning direction. Upon completion of storage, the string of addresses thus stored is then read out at a predetermined speed in the order of the string and at the same time the other line memory section of the line buffer memory 32 receives the next string of addresses from the decoder 30 to be stored therein. In this manner, the provision of such a pair of identical line memory sections in the line buffer memory 31 is advantageous because real time processing can be carried out by operating one of the line memory sections in read mode and the other in write mode at the same time.

Next, the operation of a decoded address black pixel pattern conversion unit 32 will be described in detail. An address signal generator 323 provided in the unit 32 supplies a serial address signal of 0, 2, 0, 2, 0, 2, . . . and another serial address signal of 3, 1, 3, 1, 3, 1, . . . alternately line by line if the pattern of addresses shown in FIG. 3 is programmed therein. The address signal generator 323 supplies its output signal in synchronism and phase with the string of addresses supplied as read out of the line buffer memory 31. That is, in the case where the addresses are allotted as shown in FIG. 3, when a certain decoded address is read out, (0, 2) or (3, 1) is supplied synchronously from the address signal generator 323. These two data are then inputted into a comparator 321 and then if the decoded address is larger than the address from the address signal generator 323, the comparator 321 supplies as its output "0" or white pixel, and, if not, an output of "1" or black pixel is supplied. Such an output is then supplied to the next region all white modifying circuit 322 where the erroneous comparator output (binary output) resulting from the meaningless comparison at the comparator 321 is modified by the all white address (imaginary address). That is, the all white address is an imaginary address and it does not have its acutal position, and, thus, since it is meaningless to make a comparison with the address from the address signal generator 323, the decoded addresses inputted into the comparator 321 are being monitored by an all white address detecting circuit 324 whereby when the presence of the all white address has been detected, the all white address detecting circuit 324 supplies a signal to the region all white modifying circuit 322 which thus causes the corresponding output from the comparator 321 to become "0" or white pixel positively. Specifically, in the case where the number of pixels of divided region may be expressed by the power of 2 as shown in FIG. 6, the all white address may be indicated only by MSB (and thus the lower two bits are meaningless) so that the all white address detecting circuit 324 examines the state of its MSB. And, if MSB has been detected to be high, then the region all white modifying circuit 322 provides a mask to the corresponding output from the comparator 321 thereby modifying the output such that all of its pixels have "0". In this manner, the conversion from the pattern of addresses into a distribution of black pixels indicative of halftone representation is carried out and the output signal becomes in the form of raster.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for transmitting a halftone image using an m×n dither matrix for converting said halftone image into a binary image signal, comprising the steps of:

dividing an original image to be transmitted into a mesh of regions same in shape as that of said m×n dither matrix, each of said mesh region being further subdivided into subdivisions of predetermined shape;

calculating an average value of density level for each of said regions; and subjecting said average values to a predetermined coding scheme to have said average values converted into coded data for transmission.

2. The method of claim 1 wherein said coding scheme is selected from the group consisting of run length coding, bit plane coding and prediction coding.

3. The method of claim 2 wherein if said coding scheme is carried out based on either one of said run length coding or bit plane coding, a string of said average values is set up one dimensionally or two dimensionally by selecting said average values in a zigzag format.

4. The method of claim 1 further comprising the steps of:

decoding said coded data to produce said average values upon receipt thereof after having been transmitted;

comparing each of said produced average values with a group of thresholds of said dither matrix corresponding to said corresponding region whereby each of said subdivisions is set as a black pixel if the corresponding threshold is equal to or lower than (or lower than) the corresponding average value and as a white pixel otherwise.

5. The method of claim 4 wherein MTF correction is carried out only when a difference between the average value of a region of interest and the average value of another region adjacent to said region of interest has been detected to be equal to or more than a predetermined level.

6. A method for transmitting a halftone image using an m×n dither matrix for converting said halftone image into a binary image signal, comprising the steps of:

dividing an original image to be transmitted into a plurality of regions in the form of mesh similar in shape to said dither matrix, each of said regions being subdivided into a predetermined number of subregions of predetermined shape;

calculating an average value of density level for each of said regions;

comparing each of said average value of said region with each of thresholds in a group in said dither matrix corresponding to said region thereby detecting the position of a maximum threshold among those thresholds which are equal to or smaller than (or smaller than) said average value;

converting said position into an address using a pattern of addresses previously determined in relation to the thresholds of said dither matrix region by region thereby forming a string of addresses; and subjecting said string of addresses to a predetermined coding scheme to obtain coded data for transmission.

7. The method of claim 6 wherein said coding scheme is selected from the group consisting of run length coding, bit plane coding and prediction coding.

8. The method of claim 2 wherein if said coding scheme is carried out based on either one of said run length coding or bit plane coding, a string of said average values is set up one dimensionally or two dimensionally by selecting said average values in a zigzag format.

9. The method of claim 6 further comprising the steps of:

decoding said coded data upon receipt thereof after having been transmitted to produce addresses;

comparing said each of said addresses with the corresponding region of a distribution of addresses similar in patter to said dither matrix whereby said subregion is set as a black pixel if the threshold of said subregion is equal to or less than the threshold designated by said address and as a white pixel otherwise.

10. The method of claim 9 wherein MTF correction is carried out only when a difference between the average value of a region of interest and the average value of another region adjacent to said region of interest has been detected to be equal to or more than a predetermined level.

* * * * *